Dec. 27, 1955
C. W. LINCOLN ET AL
2,728,825
DIRECTION SIGNAL SWITCH
Filed Oct. 30, 1952
3 Sheets-Sheet 1
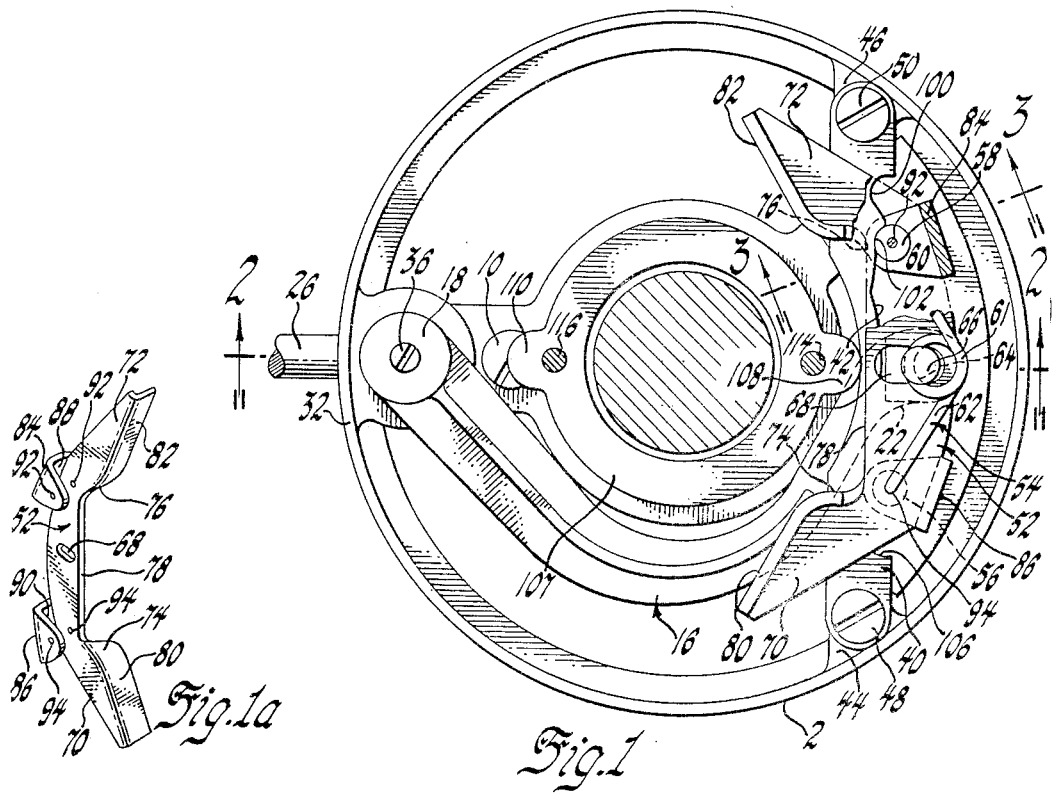
Inventors
Clovis W. Lincoln,
Errol A. Schroeder, &
Ralph A. Malone
By Willits, Helmig & Baillio
Attorneys Dec. 27, 1955  C. W. LINCOLN ET AL  2,728,825
DIRECTION SIGNAL SWITCH
Filed Oct. 30, 1952  3 Sheets-Sheet 2

Inventors
Clovis W. Lincoln,
Errol A. Schroeder, &
Ralph A. Malone
By Willits, Helmig & Baillio
Attorneys

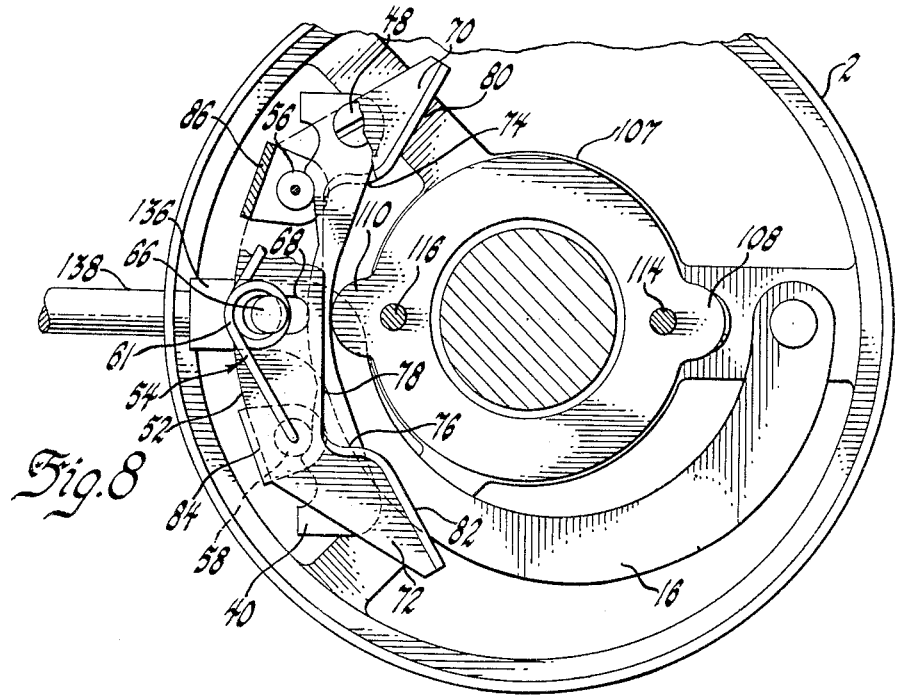
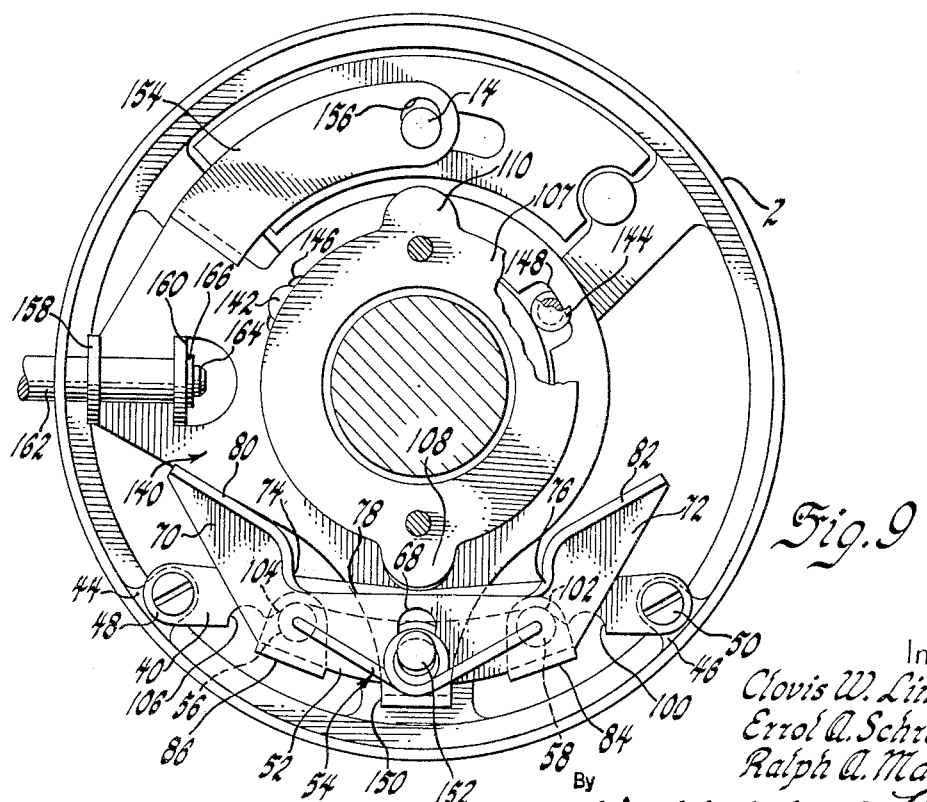

United States Patent Office 2,728,825
Patented Dec. 27, 1955

2,728,825

DIRECTION SIGNAL SWITCH

Clovis W. Lincoln, Saginaw, Errol A. Schroeder, Midland, and Ralph A. Malone, Saginaw, Mich., assignors to General Motors Corporation, Detroit, Mich., a corporation of Delaware Application October 30, 1952, Serial No. 317,672

15 Claims. (Cl. 200—61.34)

This invention relates to direction signal systems for motor vehicles and more particularly to the switch operating mechanisms associated with such systems.

Convenience to the operator and styling considerations have dictated a progressive trend toward direction signal control mechanisms disposed concentrically about the steering column of vehicles directly below the steering wheel hub. Concurrently, and for the same reasons, transmission control mechanisms have been developed which are adapted for concentric disposition about the steering column. In the prior art, concentric direction signal control mechanisms have generally imposed space requirements necessitating an undesirably large axial gap between the steering wheel hub and the transmission control collar. Since the space relation between the steering wheel hub and the transmission control collar is a basic design consideration, it is highly desirable to provide a direction signal mechanism adapted to such basic limitations.

One object of the present invention is to provide a novel and highly simplified concentric direction signal control mechanism requiring an unusually shallow space between the steering wheel hub and the transmission control collar.

Another object is to provide a switch operating mechanism which is extremely simple in construction, economic in manufacture, and highly efficient in operation.

A further object is to provide a switch operating mechanism which may be held in an operating position during the normal cancelling action incident to rotating the steering wheel in a direction opposite the indicated turn without interfering with or damaging the steering mechanism.

A still further object is to provide a mechanism of the type described, which is readily adaptable to a variety of manual control means.

Further objects and advantages of the invention will be apparent from the following description, reference being had to the accompanying drawings wherein:

Fig. 1 is a plan view, partly in section, of the preferred embodiment with parts broken away to show certain details of the construction thereof, said view being taken substantially along line 1—1 of Fig. 2.

Fig. 1a is an isometric view of the operating plate associated with the control mechanism.

Fig. 2 is a sectional side elevational view taken along the line 2—2 of Fig. 1.

Fig. 3 is a sectional view of a portion of Fig. 1 taken substantially along the line 3—3 of Fig. 1.

Fig. 8 is a plan view similar to Fig. 1 showing a further modification wherein the handle is secured at the free end of the operating arm, and;

Fig. 9 is a plan view similar to Fig. 1, showing a still further modification.

Figure 4:
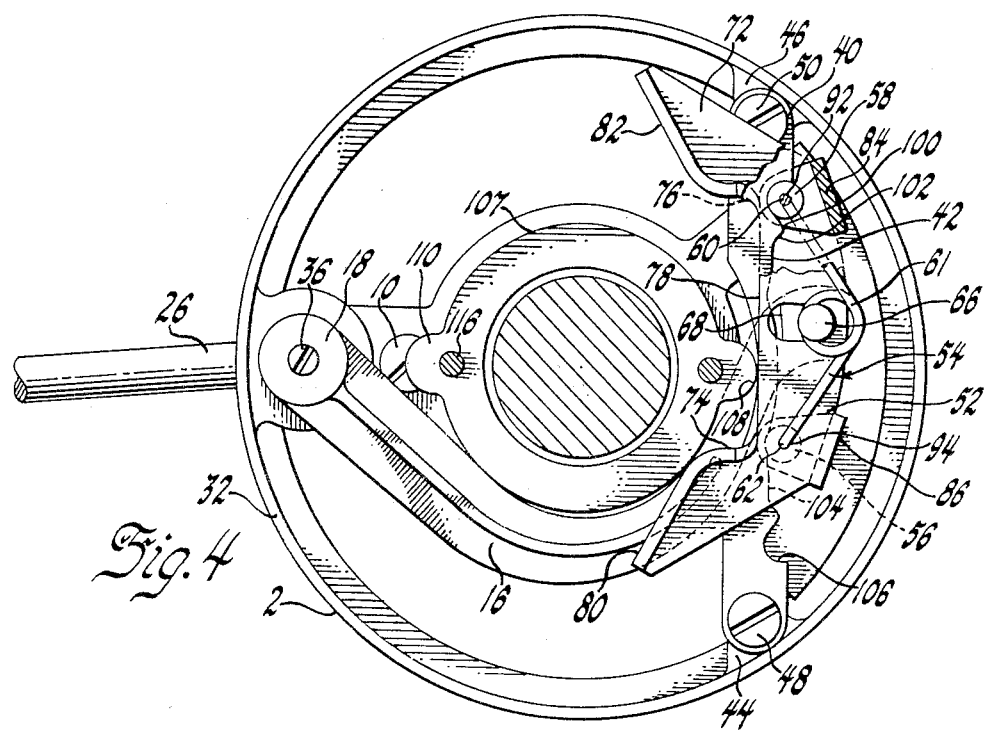
Fig. 4 is a plan view partly in section of the mechanism shown in Fig. 1, with parts broken away, showing the mechanism in one of its operating positions.

Referring now to the drawings and particularly to Figs. 1 and 2, there is shown a relatively shallow thin wall housing 2 which forms a fixed support. Housing 2 is provided with a central aperture 4 which is adapted for sleeved disposition about the upper end of a steering column 9. At one side of aperture 4 there is provided an offset slot 6 having one wall inclined upwardly and inwardly with relation to the surface of steering column 9. A wedge 8 is threadedly drawn upwardly in slot 6 by screw 10 and rigidly secures the housing 2 in position on the steering column 9.

Recessed within the housing 2 at one side thereof is an electrical switch 12 having electrical contacts 13 formed therein which are connected by lead wires 15 to signal lamps, not shown. Switch 12 is of conventional construction wherein a slidable contact bridging member is disposed in a casing having contacts attached at the bottom thereof. The slidable contact bridging member is provided with an upstanding pin 14 which extends out of the casing for manual actuation thereof. An operating arm 16 is disposed within the housing 2 and is adapted for swinging movement therein by an integral downwardly depending stud 18 which is journaled in an annular recess 20 formed in said housing. On the lower surface of its free end 22, operating arm 16 is provided with an elongated recess 24 which is adapted to receive operating pin 14 of the switch contact bridging member. A handle 26 having a circumferentially grooved end portion 28, extends through a circumferential slot 30 in the wall 32 of the housing 2 and is secured in a radial bore 34 of the stud 18 by tightening a threaded lock screw 36 provided in said stud. A detent plate 40, having a rear guiding edge 42, extends transversely across the housing 2, parallel and slightly inwardly of the switch member 12. Detent plate 40 is secured to bosses 44 and 46 on the housing 2 by means of machine screws 48 and 50 which extend through apertures provided at the respective ends of said plate. An operating plate 52, the form of which is depicted particularly in Figure 1a, is slidably mounted on the detent plate 40 and is resiliently held in operative relation therewith by a spring 54. Spring 54 is a continuous wire spring having a central loop 61 and outwardly angled arms terminating in bent down end portion 60 and 62 which engage the operating plate in a manner to be described later herein. One side of central loop 61 extends into a groove 64 provided at the inner side of a stud or projection 66 integral with and extending upwardly from the free end 22 of the operating member 16 and through an elongated slot 68 in the center of operating plate 52. At each end thereof, operating plate 52 is provided with integral wing-like portions 70 and 72. The inner edges of end portions 70 and 72 are upturned to form shoulder faces 74 and 76, respectively, at the juncture of said wing-like portions and the front edge 78 of the operating plate 52, and contiguous outwardly angled faces 80 and 82. At its rear edge, operating plate 52 is provided with tabs 84 and 86 which are bent downwardly and inwardly to form yokes 88 and 90. Vertically aligned holes 92 and 94 are formed in yokes 88 and 90 respectively. Apertured guide rollers 56 and 58 are rotatably secured within yokes 88 and 90 by downturned ends 60 and 62, respectively, of spring 54 which pass through the vertically aligned holes 92 and 94, as shown in Fig. 3, to provide rolling contact between plate 52 and guiding edge 42 of the detent plate 40. The guiding edge 42 of the detent plate 40 is provided with spaced notches 100, 102, 104 and 106, which are adapted to position the operating plate 52 in any of its three positions of adjustment. It will be apparent that the operating plate 52 is adapted for yieldable, sliding movement as the rollers move transversely along the guiding edge 42 of the detent plate 40, as well as yieldable, swingable movement about either roller 56 or 58. The direction of swingable movement of plate 52 will of course be alternate, since either end of plate 52 is swingable. A cancelling cam 107, having cancelling ears 108 and 110 formed thereon, is attached to the underside of the hub of the steering wheel 112 by screws 114 and 116 and is adapted to rotate therewith in a circular path within the housing 2 which is unobstructed when the operating plate 52 is in its neutral position shown in Fig. 1. When the operating plate 52 is moved to either the right or the left position of adjustment by manually swinging the operating arm 16 about its pivot 18, either upturned inclined surfaces 80 or 82 of the operating plate 52 will intersect the circular path of the depending cancelling ears 108 and 110.

By way of example, should the mechanism be moved to the left turn signal position as shown particularly in Fig. 4, by manually swinging the handle 26 in a counter-clockwise direction this movement is transmitted through the pivoted operating arm 16 causing the electrical switch operating finger 14 to move transversely to the left turn signal circuit bridging position. Simultaneously, the operating plate 52 is moved in the same direction along the notched guiding edges 100, 102, 104 and 106 of the detent plate 40. As the operating plate 52 moves transversely across the detent plate, the rollers 58 and 60 undulate over the crests of the notches in the detent plate 40 and settle in the left operating position as shown in Fig. 4. Upon initiating the left turn, the steering wheel 112 is rotated in a counter-clockwise direction causing the cancelling ears 108 and 110 to rotate therewith in a counter-clockwise direction until they reach the upstanding inclined surface 80 of the wing-like end 70 of the operating plate 52. Continued counter-clockwise circular movement of ears 108 and 110 cause one end of the operating plate 52 to cam yieldingly outwardly about the roller 58 as the cancelling ears successively pass inclined surface 80. It will be seen that the angular approach of the cancelling ears 108 and 110 tend to urge the operating plate further into the left turn operating position, thereby augmenting the pressure of spring 54 in retaining the adjusted position. Upon reversal of rotation of the wheel 112, the depending cancelling ears 108 and 110 will rotate in a clockwise direction until they reach the shoulder face 74 of the wing-like element 70. Because of the angle of the shoulder face 74 relative to the angular path of the cancelling ears 108 and 110, continued clockwise rotation of the said cancelling ears will carry the operating plate transversely along the detent plate 40 toward its neutral position, thereby returning the operating member 16 to the neutral position and simultaneously returning the switch connected therewith to the neutral position. If, for any reason, the operating handle 26 is forcibly retained in the left turn position while rotating the steering wheel 112 in a clockwise direction, the resulting increasing pressure of the cancelling ears 108 and 110 on the shoulder face 74 will cause the operating plate 52 to cam outwardly about the roller 58. It will thus be seen that the mechanism may be manually held in an operating position as long as desired even though the steering wheel is turned to the straight-ahead position. In addition, the structure described insures against damage to the mechanism in the event an obstruction prevents normal operation of the plate 52. It will be apparent that the operation of the mechanism for a right turn will be identical to the above description, but in the reverse sense.

Figure 5:
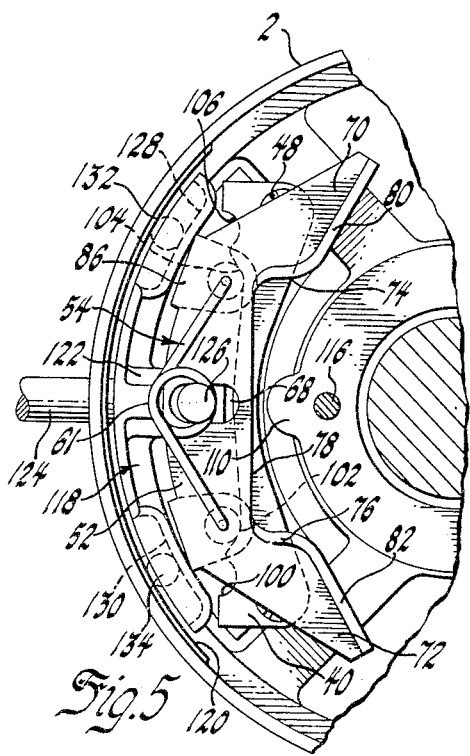
Fig. 5 is a fragmentary plan view, partly in section, of a modification of Fig. 1 showing an alternative manual control for the mechanism.
Figure 6:
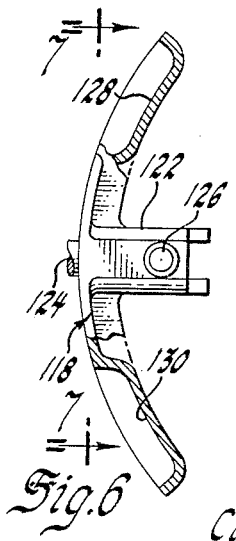
Fig. 6 is a plan view, partially broken away and partly in section, of the manual control element employed in the mechanism shown in Fig. 5.
Figure 7:
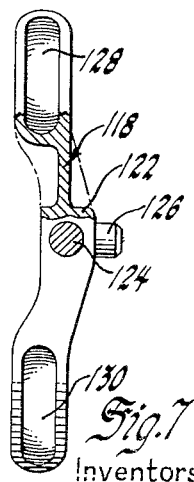
Fig. 7 is a side elevational view, partly in section, looking in the direction of arrows 7—7 of Fig. 6.

In Fig. 5 there is shown a modification of Fig. 1 wherein an arcuate member 118, shown particularly in Figs. 6 and 7, is slidably recessed in the housing 2 for curvilinear motion along the curved inner wall 120 of the housing 2. Arcuate member 118 is positioned in the housing below the detent plate 40 and has an inwardly offset sleeve portion 122 formed centrally thereof. Sleeve portion 122 is adapted to receive the inner end of an operating handle 124 which extends through an elongated slot in the housing 2. On the upper surface of its inner extremity, offset portion 122 is provided with an upstanding stud 126 which extends through the elongated slot 68 in the operating plate 52, for actuation of the latter. Since spring 54 is biased to urge the operating plate 52 inwardly against the detent plate 40, it will be apparent that the reaction of spring 54 on the upstanding stud 126 will urge the arcuate member 118 outwardly against the curved wall 120 of the housing. Arcuate member 118 is therefore provided with inwardly offset elongated recesses 128 and 130 at each end thereof. Recesses 128 and 130 are of semi-circular cross-section and are adapted to receive anti-friction balls 132 and 134 which are retained therein to provide rolling contact between the arcuate element 118 and the curved inner wall 120 of the housing 2. It will be seen that only a small segment of the annular space between the transmission control collar and the steering wheel hub is required to house the device, thereby allowing an installation even when a substantial portion of the annular space is obstructed.

In Fig. 8 there is shown another modification of Fig. 1 wherein the free end of the operating arm 16 is provided with a short tubular extension 136 which is adapted to receive the end portion of the operative handle 138. Handle 138 may be secured in the tubular extension by threadable engagement or other suitable means and like those previously described also extends through an elongated slot in housing 2. Experience has shown that not infrequently basic design limitations impose very narrow limits on the installation position of direction signal control mechanisms. Therefore, on occasions, it may be necessary to reverse the position of installation of the mechanism about the steering column in order to utilize varying depth provisions inherent in the design of the steering column, transmission control, and the steering wheel. It will be apparent that the structure shown in Fig. 8 is especially adapted for use where such requirements exist.

In Fig. 9 there is shown a still further modification of Fig. 1 wherein the manual control means is adapted for rotatable movement rather than pivotal movement. In this embodiment a generally flat operating ring 140 is disposed within the housing 2 for concentric rotatable movement about the steering column 9. To reduce friction between the ring 140 and the steering column 9, spool-like vertical rollers 142 and 144 are disposed therebetween. To retain spools 142 and 144 in position, the inner periphery of ring 140 is notched as shown at 146 and 148. The enlarged end portions of the spools 142 and 144 overlap the edges of notches 146 and 148 to retain the spools against axial shifting after assembly. Operating ring 140 is provided with a finger extension 150 at one side thereof having an upstanding stud 152 formed thereon and extending through the elongated slot 68 formed in the center of operating plate 52. At its opposite side, ring 140 is provided with an upwardly offset curved extension 154 having an elongated slot 156 formed therein for receiving the upwardly projecting operating pin 14 of the switch, which is recessed in the housing 2, as previously described. Substantially midway between the stud 152 and the elongated slot 156, ring 140 has provided thereon two integral bent-up tabs 158 and 160 having aligned apertures formed therein for receiving the inner end of an operating handle 162 which, as in the previously described construction, extends through a slot in the housing 2. Handle portion 162 is formed with a reduced end portion 164 having a groove formed therein which is adapted to receive a retaining clip ring 166 for securing the handle 162 in position.

From the foregoing description, it is seen that an extremely simple and highly reliable switch operating mechanism has been devised which is particularly suitable to very limited space requirements. The device employs an exceptionally small number of parts, which are particularly suitable for rapid fabrication and corresponding ease of assembly, thereby contributing to unusually low cost of manufacture.

While several embodiments have been shown and described, it is apparent that other changes and modifications may be made therein. It is to be understood, therefore, that it is not intended to limit the invention to the embodiment shown, but only by the scope of the claims which follow.

We claim:

1. In a device of the class described, the combination of a fixed support, a switch having a central neutral position and circuit closing positions at opposite sides of said neutral position, a steering wheel, depending cam means on said steering wheel, a slidable member having integral means thereon responsive to said cam means for returning said switch to said neutral position from either of its circuit closing positions and means on the support engaging said member, said member being pivotal at either of two spaced points on said last mentioned means without imparting movement to said switch.

2. In a device of the class described, the combination of a fixed support, a multi-position electrical switch mounted on said support, manually operable means for actuating said switch to any of its positions of adjustment, said last mentioned means including a member adapted for slidable movement, a transverse guide defining the slidable path of said member, yieldable mounting means for said member enabling the latter to pivot adjacent either end thereof with respect to said guide plate, rotary switch cancelling means, and rigid shoulder means at each end of said member engageable by said cancelling means to slidably return said switch and actuating means to neutral position after adjustment of the latter to a circuit closing position, the angle of interference of each of said shoulders with said cancelling means being such as to enable the member to pivot bodily about the end opposite the engaged shoulder when normal slidable movement is forcibly obstructed.

3. In a device of the class described, the combination of a fixed support, a multi-position electrical switch manually movable to any of its positions of adjustment, manually operable means for actuating said switch to said positions of adjustment, a steering wheel, a guide plate, disposed transversely on said support and slidable means yieldably engaging said guide plate at spaced points, said slidable means being movable along said plate responsive to rotation of said steering wheel for returning said switch to its neutral position from said manually actuated positions.

4. A direction signal control comprising a fixed support, a multi-position electrical switch mounted on said support, lever means for manually adjusting said switch to its various positions of adjustment, a rotatable cam, guide means mounted on said support, an operating plate pivotally connected to said lever means and being slidably responsive to said rotatable cam for canceling said manual adjustment of said lever means, and spring means for mounting said operating plate for slidable movement on said guide means and for alternate pivotal movement from either end thereof relative to said guide.

5. A direction signal control mechanism, comprising, a relatively shallow housing having an electrical switch mounted therein, said switch being movable from a neutral position to circuit closing positions at opposite sides of said neutral position, a depending cam adapted to rotate within said housing and defining a circular path of smaller diameter than the diameter of said housing, manual switch adjusting means extending outwardly from said housing, a transverse guide track having a plurality of notches on one edge thereof, an operating plate slidable along said track for restoring said switch to its neutral position in response to the rotation of said depending cam, and yieldable means for maintaining said operating plate in engagement with said guide track, said last mentioned means comprising a wire spring and a pair of rollers connected to said operating plate by said spring, said rollers coacting with said notches to yieldably retain said operating plate in switch operating positions.

6. In a device of the class described, the combination of a fixed support, a switch having a central neutral position and circuit closing positions at opposite sides of said neutral position, means for actuating said switch to different positions of adjustment, means operatively associated with said switch operating means for retaining said switch in adjusted position, said last mentioned means comprising a guide member having indexing notches provided therein, a member slidable on said last mentioned member having means thereon engageable in said indexing notches, and resilient means for urging said slidable member into engagement with said guide member.

7. In a device of the class described, the combination of a fixed support, a switch mounted in said support, said switch having a central neutral position and switch closing positions at opposite sides of neutral position, means for actuating said switch to said different positions of adjustment, means for retaining said switch in adjusted position comprising a guide member having fixed indexing notches thereon, a slidable member movable along said guide member and having means carried thereby resiliently engaging said notches, rotary switch cancelling means, and upstanding means integral with said slidable member adapted for engagement with said rotary cancelling means to return said slidable member and switch to said neutral position after actuation of said switch to either of its switch closing positions.

8. In a device of the class described, the combination of a fixed support, a switch mounted on said support, said switch having a central neutral position and circuit closing positions at opposite sides of said neutral position, means for actuating said switch to different positions of adjustment, means operatively associated with said switch operating means for retaining said switch in adjusted position, said last mentioned means comprising a guide member having indexing notches provided thereon, a member slidable on said last mentioned member having means thereon engageable in said indexing notches, resilient means for urging said slidable member into engagement with said guide member, rotary switch cancelling means, and means forming an integral part of said slidable member adapted for engagement by said rotary cancelling means to return said slidable member and switch to neutral position after adjustment thereof to a switch closing position.

9. A direction signal control mechanism, comprising, a housing having a relatively shallow wall portion, an electrical switch mounted in said housing at one side thereof, said switch being movable from an open neutral position to circuit closing positions at opposite sides of said neutral position, control means for manually adjusting said switch to any of its said positions, a handle connected to said control means and extending outwardly from said housing, a rotatable cam member depending into said housing, an operating plate associated with said control means and said switch and adapted for relative movement therewith, said plate being responsive to the movement of said cam when said switch is in either of its circuit closing positions, guide means for said operating plate mounted on said housing, said guide means having notches along one of its edges correlated to each of said switch adjusted positions, spring means associated with said control means and said operating plate for urging said operating plate into yielding engagement with said guide means, said spring means being adapted to allow pivotal movement of said operating plate from either end thereof, and contoured upstanding surfaces formed on said operating plate near each end thereof adapted for engagement by said cam member, whereby the rotation of said cam member in one direction will cause said operating plate to swing outwardly about one of its pivots and the rotation of said cam in the opposite direction will cause the said operating plate to slide along the said guide track to the said neutral position.

10. A direction signal control, comprising, a fixed support, a multi-position electrical switch mounted on said support, lever means for manually adjusting said switch to its various positions of adjustment, a rotatable cam, slidable plate means responsive to said rotatable cam for canceling said manual adjustment of said lever means, transverse guide means having notches thereon, said guide means defining the normal path of movement of said slidable plate means, spring means for maintaining said plate means in yielding contact with said guide means, and means associated with said spring means and said plate means for yieldably retaining said plate means in a plurality of positions on said transverse guide means, said last mentioned means including means adapted to engage said notches in said guide means.

11. A device as claimed in claim 3 wherein said slidable means comprises a relatively flat plate having upturned wing-like forward edges formed integrally at each end thereof, and a pair of downwardly offset yoke portions at its rear edge.

12. A device as claimed in claim 4 wherein said lever means comprises a pivotally mounted generally flat U-shaped member having a recess formed in the lower surface thereof, an upstanding stud formed on the upper surface thereof for engaging said plate means, an outwardly extending manual control lever, and means for securing said control lever to said U-shaped member.

13. A device as claimed in claim 9 wherein said control means comprises a relatively flat circular ring adapted for concentric rotary movement within said housing.

14. A device as claimed in claim 9 wherein said control means comprises an arcuate element adapted for sliding movement along said shallow wall portion, said element being yieldably maintained in engagement with said wall portion.

15. A direction signal switch operating mechanism comprising a fixed support, a horizontal guide plate on said support, a switch operating member resiliently engaging said guide at horizontally spaced points, said member being bodily slidable along said plate and pivotally displaceable therefrom about either of said spaced points, a switch in said support adjustable responsive only to sliding movement of said member, a rotary cancelling cam, and projecting means on each end of said member effective to slidably displace the latter when engaged by said cam in one direction and to pivotally bodily displace said member about the point adjacent its opposite end when engaged by said cam from the opposite direction.

References Cited in the file of this patent
UNITED STATES PATENTS

| | | |
|---|---|---|
| 2,236,161 | Stuart | Mar. 25, 1941 |
| 2,249,120 | Doane et al. | July 15, 1941 |
| 2,249,137 | Hill | July 15, 1941 |
| 2,264,225 | Thirlwell | Nov. 25, 1941 |
| 2,275,796 | Nacker et al. | Mar. 10, 1942 |
| 2,292,491 | Stuart | Aug. 11, 1942 |
| 2,308,108 | Roedding | Jan. 12, 1943 |
| 2,343,355 | Yanchenko et al. | Mar. 7, 1944 |
| 2,427,595 | Fuller | Sept. 16, 1947 |
| 2,678,358 | Thomson | May 11, 1954 |